(12) United States Patent
Liu

(10) Patent No.: US 11,990,717 B2
(45) Date of Patent: May 21, 2024

(54) TOP BINDING BAND AND HEAD-MOUNTED APPARATUS

(71) Applicant: Qingdao Pico Technology Co., Ltd., Qingdao (CN)

(72) Inventor: Yuanhang Liu, Qingdao (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 762 days.

(21) Appl. No.: 17/052,549

(22) PCT Filed: Jul. 30, 2019

(86) PCT No.: PCT/CN2019/098363
§ 371 (c)(1),
(2) Date: Nov. 3, 2020

(87) PCT Pub. No.: WO2020/024934
PCT Pub. Date: Feb. 6, 2020

(65) Prior Publication Data
US 2021/0175674 A1 Jun. 10, 2021

(30) Foreign Application Priority Data
Jul. 31, 2018 (CN) .......................... 201821221613.8

(51) Int. Cl.
*H01R 31/06* (2006.01)
*H01R 35/02* (2006.01)

(52) U.S. Cl.
CPC ............ *H01R 31/06* (2013.01); *H01R 35/02* (2013.01)

(58) Field of Classification Search
CPC .......... H01R 31/06; H01R 35/02; H04N 5/66; G02B 27/14; G02B 27/01; A42B 1/24; A42B 1/22
See application file for complete search history.

(56) References Cited

U.S. PATENT DOCUMENTS 3,079,609 A * 3/1963 Hoffmaster ............... A61F 9/06
   2/8.1
4,457,461 A * 7/1984 Docking .................. G12B 9/08
   359/473
(Continued)

FOREIGN PATENT DOCUMENTS

CN 204945492 U 1/2016
CN 205720878 U 11/2016
(Continued)

OTHER PUBLICATIONS

International Search Report (PCT/ISA/210) dated Sep. 27, 2019, by the China National Intellectual Property Administration (ISA/CN) as the International Searching Authority for International Application No. PCT/CN2019/098363.
(Continued)

*Primary Examiner* — Brian D Nash
(74) *Attorney, Agent, or Firm* — BakerHostetler

(57) ABSTRACT

A top binding band includes a connection binding band provided with a connection wire, and an elastic adjustable binding band below the connection binding band, wherein the connection binding band electrically connects, through the connection wire, a front-end member and a rear-end member of the head-mounted apparatus. The connection binding band can realize electrical connection between the front and rear members of the head-mounted apparatus. The adjustable binding band is located at the lower side and firstly comes into contact with the head to realize elastic support, thereby preventing the connection binding band with the fixed length and having the connection wire from being pulled, so as to enable the electrical connection to be safer and more reliable.

15 Claims, 2 Drawing Sheets

(56) References Cited

U.S. PATENT DOCUMENTS

| | | | | |
|---|---|---|---|---|
| 5,321,416 | A * | 6/1994 | Bassett | A42B 3/145 |
| | | | | 348/121 |
| 5,682,172 | A * | 10/1997 | Travers | G02B 27/0176 |
| | | | | 348/42 |
| 5,767,820 | A * | 6/1998 | Bassett | G06F 3/011 |
| | | | | 348/E5.145 |
| 6,369,952 | B1 * | 4/2002 | Rallison | G02B 27/0176 |
| | | | | 359/630 |
| 7,484,646 | B1 * | 2/2009 | Holmes | B63C 11/12 |
| | | | | 362/105 |
| 8,994,610 | B2 * | 3/2015 | Tricoukes | G02B 7/002 |
| | | | | 361/679.03 |
| 9,778,467 | B1 * | 10/2017 | White | G02B 27/0176 |
| 10,209,738 | B1 * | 2/2019 | Tompkins | G06F 1/163 |
| 10,470,512 | B1 * | 11/2019 | Yee | G02B 7/002 |
| 10,656,670 | B2 * | 5/2020 | Hu | G06F 1/1601 |
| 10,670,870 | B2 * | 6/2020 | Chueh | G02B 27/0176 |
| 2002/0118506 | A1 * | 8/2002 | Saito | G06F 1/163 |
| | | | | 361/679.03 |
| 2011/0127305 | A1 * | 6/2011 | Yates | G02B 27/0176 |
| | | | | 224/181 |
| 2016/0216512 | A1 * | 7/2016 | Miller | A42B 1/245 |
| 2016/0249124 | A1 * | 8/2016 | Drinkwater | H04R 1/105 |
| 2016/0363768 | A1 * | 12/2016 | Drinkwater | G06F 1/163 |
| 2017/0337737 | A1 * | 11/2017 | Edwards | F16M 13/04 |
| 2017/0367423 | A1 * | 12/2017 | Reitz | A42B 1/045 |
| 2018/0321707 | A1 * | 11/2018 | Hu | G02B 27/0176 |
| 2020/0348750 | A1 * | 11/2020 | Selan | G09G 3/3426 |

FOREIGN PATENT DOCUMENTS

| | | |
|---|---|---|
| CN | 205826962 U | 12/2016 |
| CN | 205910426 U | 1/2017 |
| CN | 206301077 U | 7/2017 |
| CN | 206505227 U | 9/2017 |
| CN | 207216156 U | 4/2018 |
| CN | 109212761 A | 1/2019 |
| CN | 208607439 U | 3/2019 |
| JP | H0888814 A | 4/1996 |

OTHER PUBLICATIONS

Written Opinion (PCT/ISA/237) dated Sep. 27, 2019, by the China National Intellectual Property Administration (ISA/CN) as the International Searching Authority for International Application No. PCT/CN2019/098363.

* cited by examiner

TOP BINDING BAND AND HEAD-MOUNTED APPARATUS

TECHNICAL FIELD

The present disclosure relates to the technical field of wearable apparatuses, in particular to a top binding band and a head-mounted apparatus.

BACKGROUND

In order to realize a virtual reality experience, the user usually needs to wear a virtual reality head-mounted apparatus to provide images displayed. Virtual reality head-mounted apparatuses have a high requirements on wearing comfort, and the length of time that a user can wear them is closely related to the weight of the head-mounted apparatuses. In order to achieve a balanced distribution of weight, some head-mounted apparatuses are divided into two parts which are respectively located at the front-end and rear-end of the user's head so as to improve the wearing comfort.

However, the binding band support structure of the conventional head-mounted apparatuses mostly includes left and right binding bands composed of a hard plastic structure. By forming a cavity in the plastic housing of the left and right binding bands, the FPC (Flexible Printed Circuit) or cable is hidden in the cavity and connected to the front-end and rear-end members of the head-mounted apparatus, which causes the binding bands apply a relatively large clamping force on the head and cannot adapt to different head shapes of users.

SUMMARY

In view of the problem of uncomfortable clamping caused by the use of hard plastic binding bands to fix and connect the head-mounted apparatus in the prior art, a top binding band and a head-mounted apparatus of the present disclosure are proposed to overcome the above problem or at least partially solve the above problem.

In order to achieve the above objective, the following technical solutions are adopted in the present disclosure.

According to an aspect of the present disclosure, a top binding band is provided. The top binding band comprises: a connection binding band provided with a connection wire, and an adjustable binding band below the connection binding band; the connection binding band electrically connects a front-end member and a rear-end member of a head-mounted apparatus with the connection wire; the adjustable binding band is made of an elastic material and is in contact with the top of the head of a user with its elasticity to support and fix the head-mounted apparatus.

Optionally, the adjustable binding band and the connection binding band are assembled together by a detachable connection structure.

Optionally, the detachable connection structure comprises: fixing pins provided at two ends of the connection binding band, and buckles provided at two ends of the adjustable binding band, and the buckles are capable of sleeving on the fixing pins so that the adjustable binding band and the connection binding band are assembled together.

Optionally, the detachable connection structure comprises: connection holes provided at two ends of the adjustable binding band, and two ends of the connection binding band are capable of inserting into the connection holes so that the adjustable binding band and the connection binding band are assembled together.

Optionally, the connection binding band adopts a silicone embedding structure.

Optionally, the adjustable binding band is made of silicone.

Optionally, two ends of the connection wire are exposed from two ends of the connection binding band respectively, and provided with connectors.

Optionally, two ends of the top binding band are provided with retaining rings, and the top binding band is stuck with a housing of the front-end member and the rear-end member of the head-mounted apparatus by the retaining rings.

According to another aspect of the present disclosure, a head-mounted apparatus is provided, any one of the top binding bands stated above is provided between the front-end member and the rear-end member of the head-mounted apparatus, and side binding bands are also provided between the front-end member and the rear-end member of the head-mounted apparatus.

Optionally, the side binding bands are made of a flexible material.

In sum, the beneficial effects of the present disclosure are as follows.

The top binding band of the present disclosure comprises: a connection binding band provided with a connection wire, and an elastic adjustable binding band below the connection binding band. The connection binding band can realize electrical connection between the front and the rear members of the head-mounted apparatus. The adjustable binding band can use the elasticity thereof to make contact with and be fitted to the top of the head of a user to support and fix the head-mounted apparatus, and therefore, the head-mounted apparatus can be worn in a comfortable and convenient manner, and the adjustable binding band is located at the lower side and firstly comes into contact with the head to realize elastic support, thereby also preventing the connection binding band, with a fixed length and provided with the connection wire, from being pulled, so as to enable the electrical connection to be safer and more reliable.

100: connection binding band; 110: fixing pin; 120: retaining ring; 200: adjustable binding band; 210: buckle; 220: retaining ring; 230: connection hole; 300: front host; 400: battery box; 500: side binding band.

DETAILED DESCRIPTION

In order to make the objectives, technical solutions, and advantages of the present disclosure clearer, the embodiments of the present disclosure will be further described in detail below with reference to the accompanying drawings.

In the description of the present disclosure, it should be noted that, orientation or positional relationship indicated by the terms "center", "upper", "lower", "left", "right", "vertical", "horizontal", "inside", "outside", etc. are orientation or positional relationship based on the drawings, which are merely for convenience of describing the present disclosure and simplifying the description, rather than indicating or implying that the apparatus or member referred to must have a specific orientation, or must be constructed and operated with a specific orientation, so they should not be construed as limiting the present disclosure. Moreover, the terms "first", "second" and "third" are used for descriptive purposes only and are not to be construed as indicating or implying relative importance.

In addition, in the description of the embodiments of the present disclosure, unless otherwise expressly specified and limited, the terms "installation", "connected", "connection" should be broadly understood, for example, it may be fixedly connected, or detachably connected, or integrally connected; it may also be mechanically connected, or electrically connected; it may also be directly connected, or indirectly connected via an intermediate structure, or two members may be internally communicated. For a person of ordinary skill in the art, the specific meaning of the above terms in the present disclosure should be understood according to specific practice.

The technical concept of the present disclosure is as follows. The top binding band of the head-mounted apparatus is divided into two parts: a connection binding band provided with a connection wire, and an elastic adjustable binding band below the connection binding band. The connection binding band is used to realize the electrical connection of a front-end member and a rear-end member of a head-mounted apparatus, and the elasticity of the adjustable binding band is used to make the adjustable binding band contact and fit the top of the head of a user, thereby supporting and fixing the head-mounted apparatus, thus making the wearing of the head-mounted apparatus more comfortable and convenient. Moreover, the adjustable binding band is located below and firstly contacts the user's head to realize an elastic support, which also prevents the connection binding band, with a fixed length and provided with a connection wire, from being pulled, thereby ensuring the safety and reliability of the electrical connection.

Figure 1:
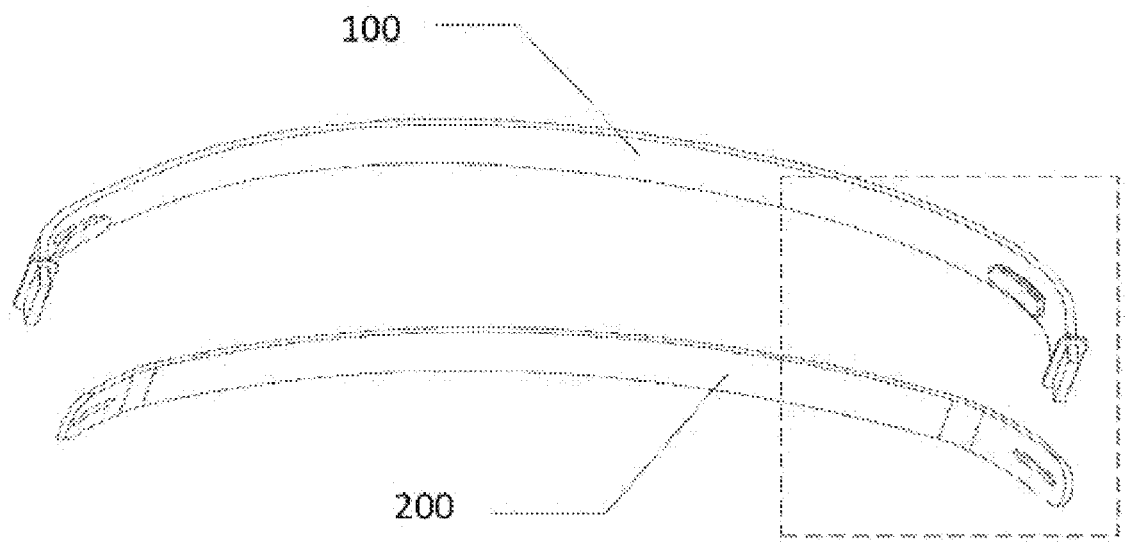
FIG. 1 is a schematic diagram of a top binding band according to an embodiment of the present disclosure.
Figure 2:
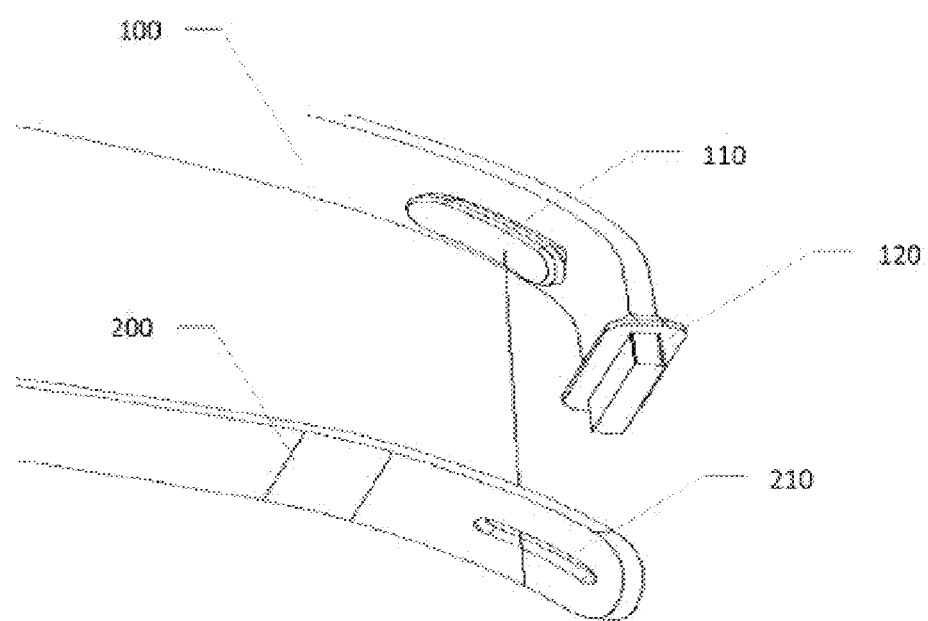
FIG. 2 is an enlarged schematic diagram of the structure indicated by a square frame in FIG. 1.

FIG. 1 and FIG. 2 show a top binding band according to an embodiment of the present disclosure. As shown in FIG. 1 and FIG. 2, a top binding band is used to run across the top of the user's head to connect and fix the head-mounted apparatus. The top binding band comprises: a connection binding band 100 provided with a connection wire, and an adjustable binding band 200 below the connection binding band 100. The connection binding band 100 electrically connects a front-end member and a rear-end member of the head-mounted apparatus with the connection wire, thereby realizing the circuit conduction between the front-end member and the rear-end member. The adjustable binding band 200 is made of an elastic material, and contacts and fits the top of the user's head by its elasticity to support and fix the head-mounted apparatus. The adjustable binding band 200 made of an elastic material can automatically adapt to different head shapes and sizes of users, and adjust its shape and length freely, thereby improving the user's wearing comfort of the head-mounted apparatus.

By using the double-layer structured top binding band comprising the connection binding band 100 and the adjustable binding band 200 according to the present disclosure, not only the electrical connection between the front-end member and the rear-end member of the head-mounted apparatus can be realized, but also the top binding band can adapt to the shapes and sizes of the head of users and automatically adjust its shape and size, thereby improving the wearing comfort of users. The adjustable binding band 200 is located below the connection binding band 100, and in its natural state, the length of the adjustable binding band 200 is less than the length of the connection binding band 100, so the adjustable binding band 200 contacts the user's head first, which prevents the connection binding band 100, with a fixed length and provided with a connection wire, from being pulled, thereby ensuring the safety and reliability of the electrical connection.

In some embodiments of the present disclosure, the adjustable binding band 200 and the connection binding band 100 are assembled together by a detachable connection structure. Therefore, when one of the adjustable binding band 200 and the connection binding band 100 is damaged, it can be easily replaced and repaired, which reduces the maintenance cost of the top binding band.

As shown in the enlarged view of FIG. 2, the detachable connection structure between the adjustable binding band 200 and the connection binding band 100 comprises: fixing pins 110 provided at two ends of the connection binding band 100, and buckles 210 provided at two ends of the adjustable binding band 200. Under the action of elastic expansion and contraction of the adjustable binding band 200, the buckle 210 can be sleeved on the fixing pin 110, so that the adjustable binding band 200 and the connection binding band 100 are assembled together.

Figure 3:
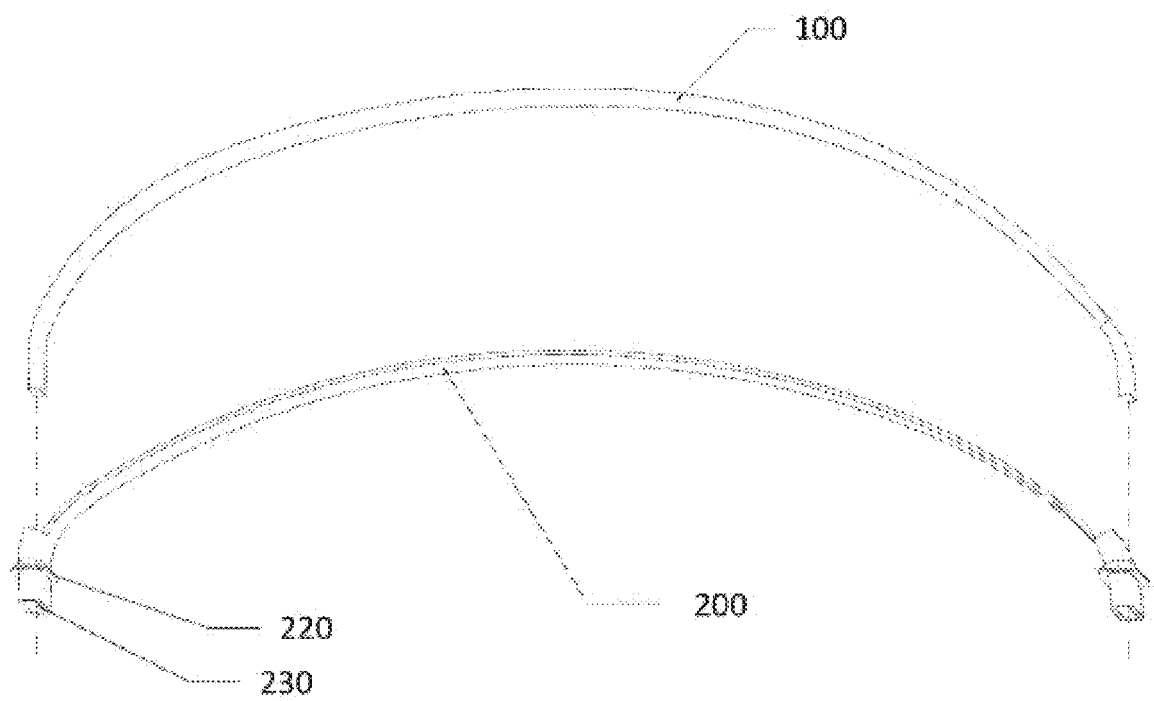
FIG. 3 is a schematic diagram of a top binding band according to another embodiment of the present disclosure.

FIG. 3 is a schematic diagram of the top binding band according to another embodiment of the present disclosure, which shows another detachable connection structure.

As shown in FIG. 3, the detachable connection structure between the adjustable binding band 200 and the connection binding band 100 comprises connection holes 230 provided at two ends of the adjustable binding band 200, and two ends of the connection binding band 100 can be inserted into the connection holes 230, so that the adjustable binding band 200 and the connection binding band 100 are assembled together. In FIG. 3, the connection holes 230 are provided on the outer side of the adjustable binding band 200, and two ends of the connection binding band 100 are provided in a plug shape corresponding to the connection holes 230. The two ends of the connection binding band 100 are inserted from the upper ends of the connection holes 230 and go out from the lower ends of the connection holes 230, thereby exposing the terminals of the connection wire and electrically connecting them to the front and the rear members of the head-mounted apparatus.

In some embodiments of the present disclosure, the connection binding band 100 adopts a silicone embedding structure, and the connection wire is embedded inside or on the surface of the silicone of the connection binding band 100.

In some embodiments of the present disclosure, the adjustable binding band 200 is made of silicone, which has a good elasticity and softness, thus fits the top of the user's head well and makes wearing more comfortable.

In some embodiments of the present disclosure, two ends of the connection wire are respectively exposed from the two ends of the connection binding band 100, and are provided with connectors, such as insertable plug, so that they can be easily electrically connected to the front and the rear members of the head-mounted apparatus.

In some embodiments of the present disclosure, two ends of the top binding band are provided with retaining rings, for example, retaining rings 120 provided at two ends of the connection binding band 100 as shown in FIG. 2, or retaining rings 220 provided at two ends of the adjustable binding band 200 as shown in FIG. 3. The top binding band is stuck with the housing of the front-end member and the rear-end member of the head-mounted apparatus by the retaining rings, as shown in the embodiment of the head-mounted apparatus shown in FIG. 4. The retaining rings make the top binding band stuck with the front-end member and the rear-end member of the head-mounted apparatus to ensure that the top binding band is firmly connected, and a dust-proof effect is also provided.

Figure 4:
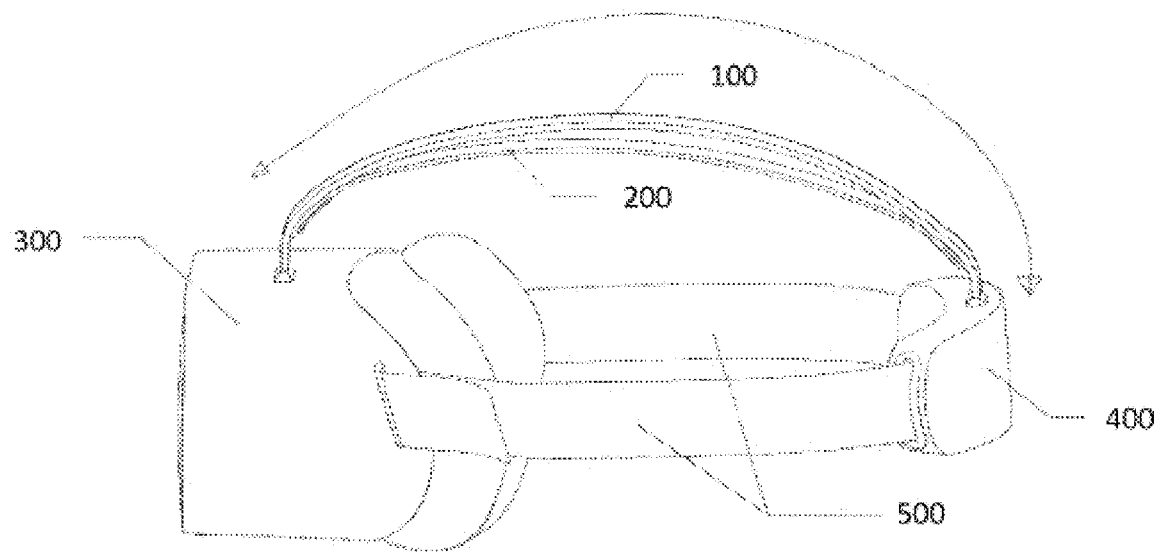
FIG. 4 is a schematic diagram of a head-mounted apparatus according to an embodiment of the present disclosure.

The present disclosure also discloses a head-mounted apparatus. FIG. 4 shows a schematic diagram of a head-mounted apparatus according to an embodiment of the present disclosure. As shown in FIG. 4, a top binding band as shown in any of the above embodiments is provided between a front-end member and a rear-end member of the head-mounted apparatus, and side binding band 500 are also provided between the front-end member and the rear-end member of the head-mounted apparatus.

As shown in FIG. 4, by installing and using the top binding bands disclosed in the above embodiments of the present disclosure, a safe and reliable electrical connection between the front-end member and the rear-end member of the head-mounted apparatus can be realized by the connection binding band 100. Since the connection binding band 100 is provided with a connection wire, its length is fixed and it cannot be pulled at will. Under such a situation, due to the elastic effect of the adjustable binding band 200, when the head-mounted apparatus is worn, the length of the adjustable binding band 200 will increase and thus a pulling force is generated, which has a lifting effect on the head-mounted apparatus and thus supports the weight of the head-mounted apparatus. Moreover, the elastic adjustable binding band 200 can adapt to the shapes and sizes of the head of users, thereby improving the wearing comfort. In the present disclosure, the wiring adapts a top-running form with the top binding band, and there is no need to provide an internal cavity in the side binding band 500 for wiring, thus the problems of high cost and stability risks caused by providing FPC wiring in the internal cavity can be avoided, and the problems of appearance and portability caused by providing the internal cavity in the side binding band 500, making the structure incompact, can also be avoided.

In some embodiments of the present disclosure, as shown in FIG. 4, the side binding band 500 is made of a flexible material, such as a nylon weaving binding band, which fits the face better and more comfortably. Since there is no need to manufacture a hard plastic structure with an internal cavity, the manufacturing cost of the side binding band 500 is reduced.

In some embodiments of the present disclosure, the side binding band 500 is provided as a binding band passing through the rear-end member, or as two binding bands on left and right respectively connected between the front-end member and the rear-end member.

In some embodiments of the present disclosure, as shown in FIG. 4, the front-end member of the head-mounted apparatus is a front host 300, and the rear-end member of the head-mounted apparatus is a battery box 400. If the battery box 400 is removed from the virtual reality all-in-one machine, which has a processor and can independently provide virtual reality images, and placed on the back of the head, the front and rear weights of the head-mounted apparatus can be effectively balanced, thereby reducing the pressure applied on the user's face and improving the wearing comfort.

The above merely describes particular embodiments of the present disclosure. By the teaching of the present disclosure, a person skilled in the art can make other modifications or variations based on the above embodiments. A person skilled in the art should appreciate that, the detailed description above is only for the purpose of better explaining the present disclosure, and the protection scope of the present disclosure should be subject to the protection scope of the claims.

What is claimed is:

1. A top binding band, comprising:
a connection binding band provided with a connection wire, and an adjustable binding band below the connection binding band; wherein the connection binding band electrically connects a front-end member and a rear-end member of a head-mounted apparatus with the connection wire; the adjustable binding band is made of an elastic material and is in contact with the top of the head of a user with its elasticity to support and fix the head-mounted apparatus,
wherein two ends of the top binding band are provided with retaining rings, and the top binding band is stuck with a housing of the front-end member and the rear-end member of the head-mounted apparatus by the retaining rings.

2. The top binding band according to claim 1, wherein the adjustable binding band and the connection binding band are assembled together by a detachable connection structure.

3. The top binding band according to claim 2, wherein the detachable connection structure comprises: fixing pins provided at two ends of the connection binding band, and buckles provided at two ends of the adjustable binding band, and the buckles are capable of sleeving on the fixing pins so that the adjustable binding band and the connection binding band are assembled together.

4. The top binding band according to claim 2, wherein the detachable connection structure comprises: connection holes provided at two ends of the adjustable binding band, and two ends of the connection binding band are capable of inserting into the connection holes so that the adjustable binding band and the connection binding band are assembled together.

5. The top binding band according to claim 1, wherein the connection binding band adopts a silicone embedding structure.

6. The top binding band according to claim 1, wherein the adjustable binding band is made of silicone.

7. The top binding band according to claim 1, wherein two ends of the connection wire are exposed from two ends of the connection binding band respectively, and provided with connectors.

8. A head-mounted apparatus, wherein a top binding band is provided between a front-end member and a rear-end member of the head-mounted apparatus, and side binding bands are also provided between the front-end member and the rear-end member of the head-mounted apparatus,
the top binding band comprising: a connection binding band provided with a connection wire, and an adjustable binding band below the connection binding band; wherein the connection binding band electrically connects the front-end member and the rear-end member of the head-mounted apparatus with the connection wire; the adjustable binding band is made of an elastic material and is in contact with the top of the head of a user with its elasticity to support and fix the head-mounted apparatus,
wherein two ends of the top binding band are provided with retaining rings, and the top binding band is stuck with a housing of the front-end member and the rear-end member of the head-mounted apparatus by the retaining rings.

9. The head-mounted apparatus according to claim 8, wherein the side binding bands are made of a flexible material.

10. The head-mounted apparatus according to claim 8, wherein the adjustable binding band and the connection binding band are assembled together by a detachable connection structure.

11. The head-mounted apparatus according to claim 8, wherein the detachable connection structure comprises: fixing pins provided at two ends of the connection binding band, and buckles provided at two ends of the adjustable binding band, and the buckles are capable of sleeving on the fixing pins so that the adjustable binding band and the connection binding band are assembled together.

12. The head-mounted apparatus according to claim 8, wherein the detachable connection structure comprises: connection holes provided at two ends of the adjustable binding band, and two ends of the connection binding band are capable of inserting into the connection holes so that the adjustable binding band and the connection binding band are assembled together.

13. The head-mounted apparatus according to claim 8, wherein the connection binding band adopts a silicone embedding structure.

14. The head-mounted apparatus according to claim 8, wherein the adjustable binding band is made of silicone.

15. The head-mounted apparatus according to claim 8, wherein two ends of the connection wire are exposed from two ends of the connection binding band respectively, and provided with connectors.

* * * * *